(12) United States Patent
Takahashi et al.

(10) Patent No.: US 10,757,659 B2
(45) Date of Patent: Aug. 25, 2020

(54) TERMINAL AND COMMUNICATION METHOD

(71) Applicant: Panasonic Intellectual Property Management Co., Ltd., Osaka (JP)

(72) Inventors: Ryo Takahashi, Miyagi (JP); Akihiro Saito, Kanagawa (JP); Hidenori Matsuo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/372,982

(22) Filed: Apr. 2, 2019

(65) Prior Publication Data

US 2019/0230604 A1 Jul. 25, 2019

Related U.S. Application Data

(63) Continuation of application No. PCT/JP2016/005197, filed on Dec. 20, 2016.

(30) Foreign Application Priority Data

Oct. 18, 2016 (JP) ................................. 2016-204506

(51) Int. Cl.
*H04W 52/24* (2009.01)
*H04W 16/32* (2009.01)
(Continued)

(52) U.S. Cl.
CPC ............. *H04W 52/243* (2013.01); *H04J 1/00* (2013.01); *H04J 11/005* (2013.01);
(Continued)

(58) Field of Classification Search
CPC ..... H04W 16/32; H04W 16/28; H04W 24/08; H04W 72/082; H04W 88/02;
(Continued)

(56) References Cited

U.S. PATENT DOCUMENTS

2007/0116140 A1* 5/2007 Sawada ................... H04L 27/38
375/260
2007/0129096 A1* 6/2007 Okumura .............. H04W 52/40
455/522

(Continued)

FOREIGN PATENT DOCUMENTS

JP 2012-104950 A 5/2012
JP 2012-169738 A 9/2012

(Continued)

OTHER PUBLICATIONS

Alcatel-Lucent, "Correction to terminology w.r.t. time-domain ICIC," R2-112234, 3GPP TSG-RAN WG2 Meeting #73bis, Shanghai, China, Apr. 11-15, 2011, 7 pages.

(Continued)

*Primary Examiner* — Brian D Nguyen
(74) *Attorney, Agent, or Firm* — Seed IP Law Group LLP

(57) ABSTRACT

A terminal includes: a receiver, which, in operation, receives a plurality of data signals that is spatially multiplexed, the plurality of data signals being transmitted from a small-cell base station disposed in an area covered by a macro-cell base station; an estimator, which, in operation, estimates power of a signal from the macro-cell base station as interfering-signal power; and a signal separator, which, in operation, generates a reception weight based on the interfering-signal power and separates the plurality of data signals from each other based on the reception weight.

11 Claims, 4 Drawing Sheets

(51) Int. Cl.
  *H04W 24/08*   (2009.01)
  *H04W 72/04*   (2009.01)
  *H04W 72/08*   (2009.01)
  *H04J 1/00*    (2006.01)
  *H04J 11/00*   (2006.01)
  *H04W 88/02*   (2009.01)
  *H04W 16/28*   (2009.01)
  *H04W 84/10*   (2009.01)
  *H04W 88/08*   (2009.01)
  *H04B 7/0413*  (2017.01)

(52) U.S. Cl.
  CPC ......... *H04W 16/28* (2013.01); *H04W 16/32* (2013.01); *H04W 24/08* (2013.01); *H04W 72/0406* (2013.01); *H04W 72/082* (2013.01); *H04W 84/10* (2013.01); *H04W 88/02* (2013.01); *H04B 7/0413* (2013.01); *H04W 88/08* (2013.01)

(58) Field of Classification Search
  CPC ......... H04W 52/243; H04W 72/0406; H04W 84/10; H04W 84/045; H04W 88/08; H04J 11/005; H04J 1/00; H04B 7/0413
  See application file for complete search history.

(56) References Cited

U.S. PATENT DOCUMENTS

| | | |
|---|---|---|
| 2012/0243002 A1 | 9/2012 | Yu |
| 2013/0279358 A1 | 10/2013 | Nagata et al. |
| 2013/0315191 A1 | 11/2013 | Yoshimoto et al. |
| 2014/0243002 A1 | 8/2014 | Muruganathan et al. |
| 2014/0256341 A1* | 9/2014 | Nayeb Nazar ...... H04W 72/082 455/452.1 |
| 2015/0031384 A1 | 1/2015 | Jiang et al. |
| 2015/0295631 A1* | 10/2015 | Yoshimoto .............. H04L 1/003 370/329 |
| 2016/0029321 A1* | 1/2016 | Hwang ................... H04J 11/005 455/450 |
| 2016/0255590 A1* | 9/2016 | Wang ................... H04B 7/0626 370/329 |
| 2016/0262035 A1* | 9/2016 | Yang ..................... H04L 5/0091 |
| 2017/0078061 A1* | 3/2017 | Sawahashi .......... H04L 27/2698 |
| 2018/0034525 A1* | 2/2018 | Park ....................... H04B 17/24 |
| 2018/0324693 A1* | 11/2018 | Yu ..................... H04W 72/1205 |

FOREIGN PATENT DOCUMENTS

| | | |
|---|---|---|
| JP | 2013-123163 A | 6/2013 |
| JP | 5383725 B2 | 1/2014 |
| JP | 2015-510321 A | 4/2015 |
| WO | 2013/108135 A1 | 7/2013 |

OTHER PUBLICATIONS

InterDigital, "eICIC ABS Patterns," R2-106419, 3GPP TSG-RAN WG2 meeting #72, Jacksonville, USA, Nov. 15-19, 2010.
Sano et al., "Investigation on Inter-cell Successive Interference Canceller Based on Soft Detection in LTE-Advanced Downlink," The Institute of Electronics, Information and Communication Engineers, IEICE Technical Report, Dec. 2013, 7 pages (with English Abstract).

* cited by examiner

TERMINAL AND COMMUNICATION METHOD

This application is a continuation application of PCT International Application No. PCT/JP2016/005197 filed on Dec. 20, 2016, which claims the benefit of foreign priority of Japanese patent application 2016-204506 filed on Oct. 18, 2016, the contents all of which are incorporated herein by reference.

BACKGROUND

1. Technical Field

The disclosure relates to a terminal and a communication method.

2. Description of the Related Art

A method of offloading traffic using a heterogeneous network (HetNet), in which a macro cell and a small cell coexists, has been examined recently. In the heterogeneous network, a small-cell base station, which performs communication with low transmission power, is disposed in an area covered by a macro-cell base station (may be referred to as an eNB or a BS), which performs communication with high transmission power.

In the heterogeneous network, interference from the macro-cell base station occurs in a terminal (may be referred to as user equipment (UE) or a mobile station (MS)) (referred to as an in-small-cell terminal hereinafter) connected to the small-cell base station, in a case where the same carrier frequency is used between the macro cell and the small cell (case of a Co-Channel HetNet). Such inter-cell interference is significant at a cell edge.

In order to prevent the inter-cell interference, suspending transmission of the macro-cell base station during communication in the small cell may be considered. In the macro-cell, however, a terminal (referred to as an in-macro-cell terminal hereinafter) connected to the macro-cell base station also exists outside the area of the small cell. For the in-macro-cell terminal to continue communication, the macro-cell base station is required to continue transmission of a signal (for example, synchronization signal, broadcast channel, and cell-specific reference signal (CRS)) even in a period of suspending transmission of the macro-cell base station (referred to as almost blank subframe (ABS) transmission hereinafter).

Thus, the in-small-cell terminal needs to reduce the interference originating from ABS transmission by the macro-cell base station, in order to improve reception quality of a desired signal. As a conventional interference reduction method, for example, Japanese Patent No. 5383725 and Japanese Patent Unexamined Publication No. 2013-123163 disclose a method of removing an interference component by a terminal generating a replica (referred to as "an interference replica" hereinafter) of an interfering signal from a replica of a transmission signal transmitted by a base station and a channel estimation value, and subtracting the interference replica from a reception signal.

SUMMARY

One non-limiting and exemplary embodiment facilitates providing a terminal and a communication method that is possible to reduce inter-cell interference from a macro cell into a small cell without relying on estimation accuracy of a channel.

In one general aspect, the techniques disclosed here feature a terminal including: a receiver, which, in operation, receives a plurality of data signals that is spatially multiplexed, the plurality of data signals being transmitted from a small-cell base station disposed in an area covered by a macro-cell base station; an estimator, which, in operation, estimates power of a signal from the macro-cell base station as interfering-signal power; and a signal separator, which, in operation, generates a reception weight based on the interfering-signal power and separates the plurality of data signals from each other based on the reception weight.

In another general aspect, the techniques disclosed here feature a communication method including: receiving a plurality of data signals that is spatially multiplexed, the plurality of data signals being transmitted from a small-cell base station disposed in an area covered by a macro-cell base station; estimating power of a signal from the macro-cell base station as interfering-signal power; and generating a reception weight based on the interfering-signal power and separating the plurality of data signals from each other based on the reception weight.

According to an aspect of the disclosure, it is possible to reduce inter-cell interference from a macro-cell into a small cell without depending on estimation accuracy of a channel. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Prior to providing a specific description of exemplary embodiments of the present disclosure, underlying knowledge forming a basis of the exemplary embodiments will be described. In a case where the frequency of a channel fluctuates largely as in a multipath environment, the method of removing the interference component by using the interference replica, as in Japanese Patent No. 5383725 and Japanese Patent Unexamined Publication No. 2013-123163, suffers deterioration in channel estimation accuracy, increase in an error of the interference replica generated based on the channel estimation value, and thus decrease in an interference reduction effect.

Hereinafter, an exemplary embodiment according to an aspect of the disclosure will be described in detail with reference to the drawings.

[Outline of Communication System]

Figure 1:
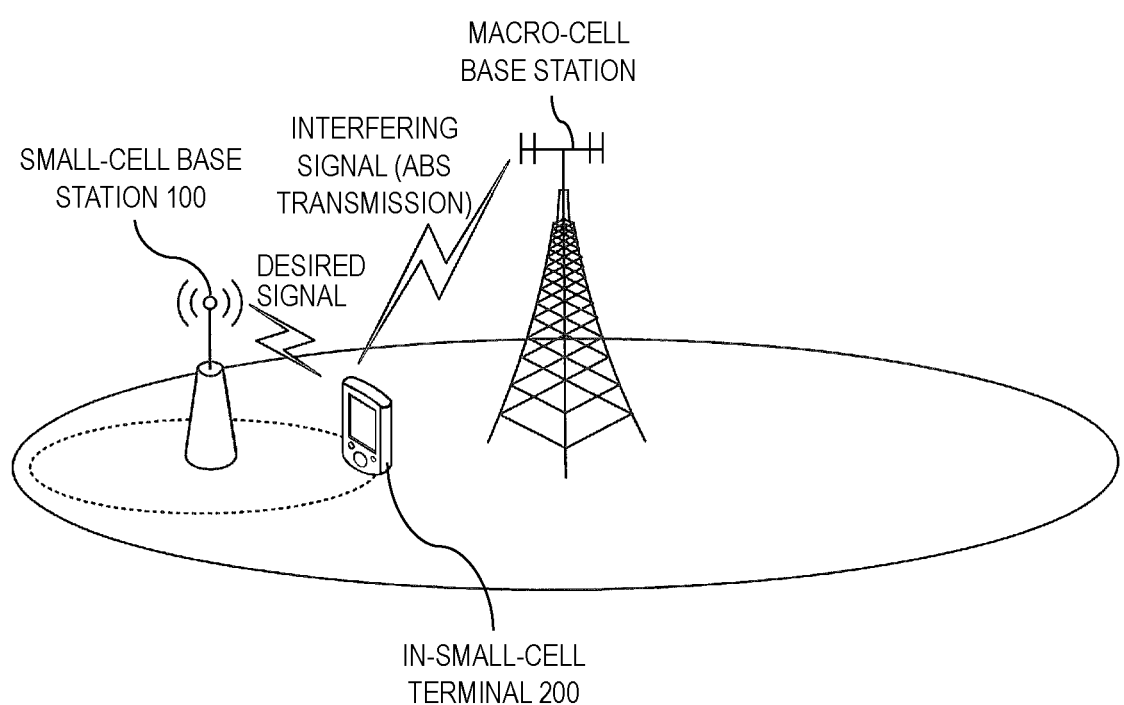
FIG. 1 is a diagram illustrating a configuration example of a communication system according to an aspect of the disclosure.

FIG. 1 illustrates a configuration example of a communication system according to an exemplary embodiment. The communication system illustrated in FIG. 1 includes at least a macro-cell base station, small-cell base station 100, and in-small-cell terminal 200. In FIG. 1, a communication area (solid line) covered by the macro-cell base station includes a communication area (dashed line) covered by small-cell base station 100. In FIG. 1, small-cell base station 100 communicates with in-small-cell terminal 200. The macro-cell base station communicates with an in-macro-cell terminal (not illustrated). The macro-cell and the small cell use the same carrier frequency.

In the exemplary embodiment, spatial multiplexing transmission by multiple input and multiple output (MIMO) is performed at least between small-cell base station 100 and in-small-cell terminal 200. That is, in-small-cell terminal 200 receives a plurality of data signals which is transmitted from small-cell base station 100 disposed in the area covered by the macro-cell base station and is spatially multiplexed.

As illustrated in FIG. 1, the macro-cell base station performs ABS transmission during communication in a small cell. Thus, in in-small-cell terminal 200, a signal at time of ABS transmission from the macro-cell base station acts, as an interfering signal, on a transmission signal (desired signal) from small-cell base station 100.

Each of the macro-cell base station and small-cell base station 100 transmits a cell-specific reference signal (CRS). A CRS transmitted from the macro-cell base station is referred to as "a macro-cell CRS" below. A CRS transmitted from small-cell base station 100 is referred to as "a small cell CRS" hereinafter.

[Configuration of Small-Cell Base Station 100]

Figure 2:
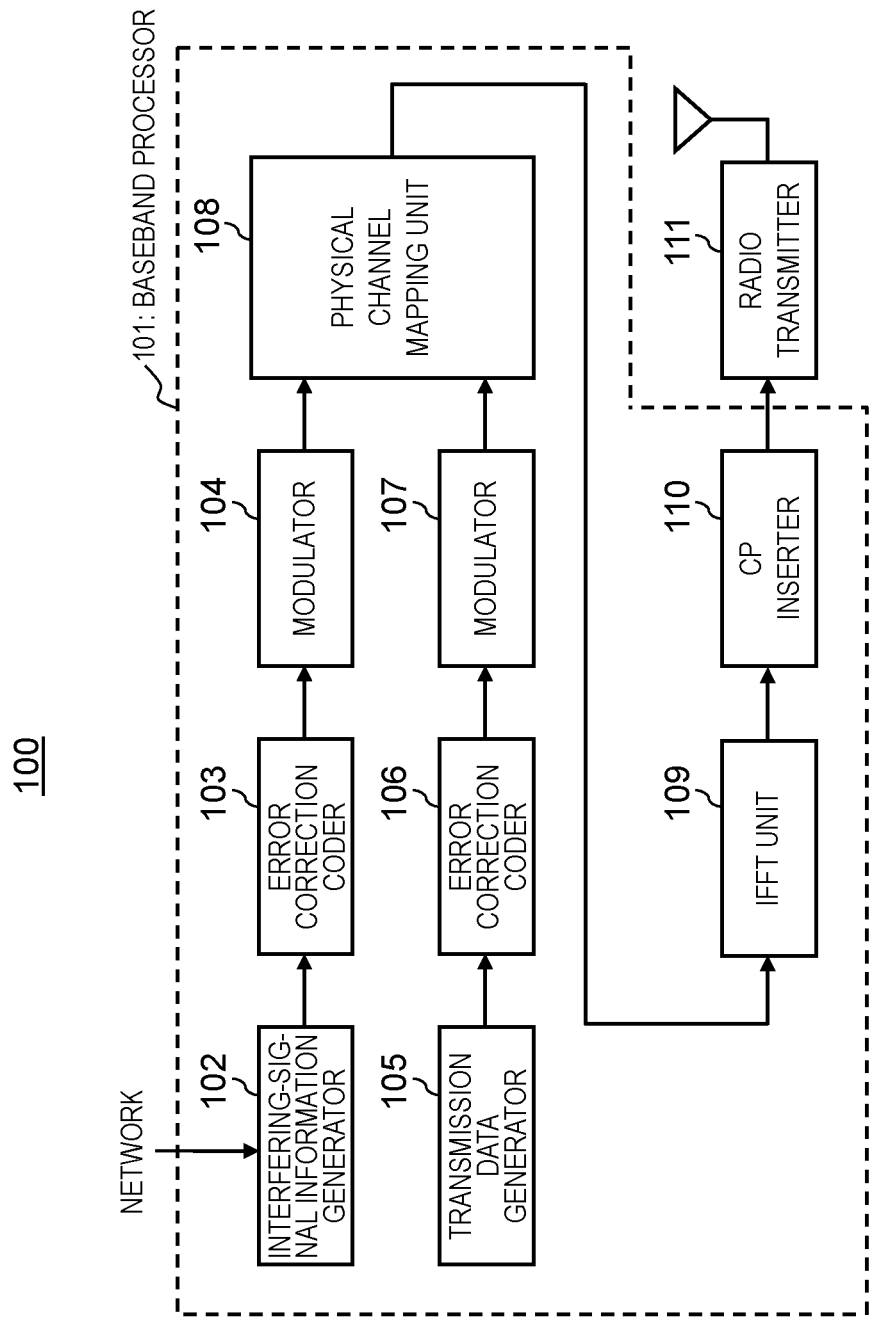
FIG. 2 is a block diagram illustrating a configuration example of a small-cell base station according to the aspect of the disclosure.

FIG. 2 is a block diagram illustrating an example of a configuration of small-cell base station 100 according to the exemplary embodiment. In FIG. 2, illustrations are made focusing on components relating to the aspect of the disclosure among components of small-cell base station 100.

Small-cell base station 100 includes baseband processor 101 and radio transmitter 111. Baseband processor 101 includes interfering-signal information generator 102, error correction coder 103, modulator 104, transmission data generator 105, error correction coder 106, modulator 107, physical channel mapping unit 108, inverse fast Fourier transform (IFFT) unit 109, and cyclic prefix (CP) inserter 110.

Interfering-signal information generator 102 acquires information (hereinafter, interfering signal information) regarding a signal (that is, interfering signal into a small cell) which is ABS-transmitted from the macro-cell base station via a network. Interfering-signal information generator 102 generates a control signal including the interfering signal information. The interfering signal information includes, for example, a cell ID of a macro-cell base station that performs ABS transmission, the number of transmission antennae, and an ABS transmission pattern indicating resources (for example, subframes) for ABS transmission. Interfering-signal information generator 102 outputs a control signal including the interfering signal information to error correction coder 103.

Error correction coder 103 performs error correction coding on the control signal input from interfering-signal information generator 102 and outputs the coded control signal to modulator 104.

Modulator 104 modulates the control signal input from error correction coder 103 and outputs the modulated control signal to physical channel mapping unit 108.

Transmission data generator 105 generates transmission data (downlink data signal) for each in-small-cell terminal 200 and outputs the generated transmission data to error correction coder 106.

Error correction coder 106 performs error correction coding on the transmission data input from transmission data generator 105 and outputs the coded transmission data to modulator 107.

Modulator 107 modulates the transmission data input from error correction coder 106 and outputs the modulated transmission data to physical channel mapping unit 108.

Physical channel mapping unit 108 maps the control signal input from modulator 104 and the transmission data input from modulator 107, on predetermined physical channel resources. Physical channel mapping unit 108 maps the small cell CRS on predetermined resources (not illustrated). Physical channel mapping unit 108 outputs the signal after mapping, to IFFT unit 109.

IFFT unit 109 performs IFFT processing on the signal input from physical channel mapping unit 108, and thereby converts a frequency domain signal into a time domain signal. IFFT unit 109 outputs the time domain signal to CP inserter 110.

CP inserter 110 inserts a CP into the signal input from IFFT unit 109 and outputs the signal (for example, referred to as an orthogonal frequency division multiplexing (OFDM) signal) after the insertion of the CP, to radio transmitter 111.

Radio transmitter 111 performs radio frequency (RF) processing such as D/A conversion and up-conversion, on the signal input from CP inserter 110. Radio transmitter 111 transmits a radio signal to in-small-cell terminal 200 through an antenna. The downlink data signal transmitted from small-cell base station 100 is multiplied (precoded) by the transmission weight. The downlink data signal is transmitted in a state where a plurality of streams is spatially multiplexed.

[Configuration of In-Small-Cell Terminal 200]

Figure 3:
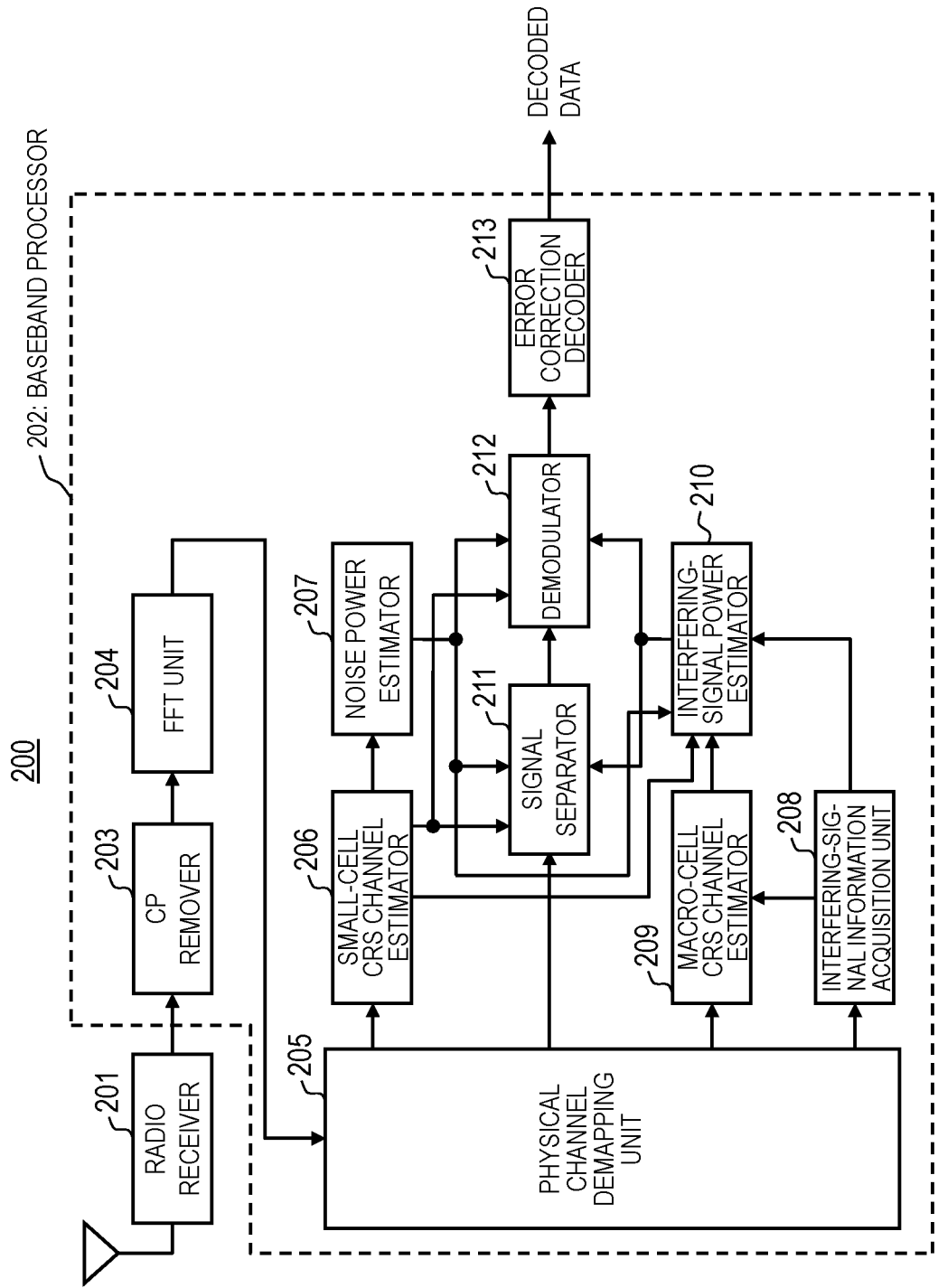
FIG. 3 is a block diagram illustrating a configuration of an in-small-cell terminal according to the aspect of the disclosure.

FIG. 3 is a block diagram illustrating an example of a configuration of in-small-cell terminal 200 according to the exemplary embodiment. In FIG. 3, illustrations are made focusing on components relating to the aspect of the disclosure among components of in-small-cell terminal 200.

In-small-cell terminal 200 includes radio receiver 201 and baseband processor 202. Baseband processor 202 includes CP remover 203, fast Fourier transform (FFT) unit 204, physical channel demapping unit 205, small-cell CRS channel estimator 206, noise power estimator 207, interfering-signal information acquisition unit 208, macro-cell CRS channel estimator 209, interfering-signal power estimator 210, signal separator 211, demodulator 212, and error correction decoder 213.

Radio receiver 201 performs RF processing such as down-conversion and A/D conversion on a radio signal received through an antenna and outputs a reception signal obtained by the RF processing to CP remover 203. The reception signal includes a signal (desired signal) from small-cell base station 100 and a signal (interfering signal) from the macro-cell base station.

CP remover 203 removes a CP being inserted into the reception signal input from radio receiver 201 and outputs a signal obtained by removing the CP, to FFT unit 204.

FFT unit 204 performs FFT processing on the signal input from CP remover 203, and thereby converts a time domain signal into a frequency domain signal. FFT unit 204 outputs the frequency domain signal to physical channel demapping unit 205.

Physical channel demapping unit 205 extracts a downlink data signal, a control signal (including interfering signal information), a small cell CRS, and a macro-cell CRS from the signal input from FFT unit 204. Physical channel demapping unit 205 outputs the downlink data signal to signal separator 211, outputs the control signal to interfering-signal information acquisition unit 208, outputs the small cell CRS to small-cell CRS channel estimator 206, and outputs the macro-cell CRS to macro-cell CRS channel estimator 209.

Small-cell CRS channel estimator 206 calculates a channel estimation value (referred to as a small-cell CRS channel estimation value hereinafter) based on the small cell CRS input from physical channel demapping unit 205. Small-cell CRS channel estimator 206 outputs the small-cell CRS channel estimation value to signal separator 211, demodulator 212, noise power estimator 207, and interfering-signal power estimator 210.

Noise power estimator 207 estimates noise power based on the small-cell CRS channel estimation value and outputs the estimated noise power to signal separator 211, demodulator 212, and interfering-signal power estimator 210.

Interfering-signal information acquisition unit 208 acquires interfering signal information from the control signal input from physical channel demapping unit 205. Interfering-signal information acquisition unit 208 notifies macro-cell CRS channel estimator 209 of a cell ID of the macro-cell base station and a timing for performing channel estimation. Interfering-signal information acquisition unit 208 performs an instruction to receive the corresponding macro-cell CRS from physical channel demapping unit 205. Interfering-signal information acquisition unit 208 notifies interfering-signal power estimator 210 of a timing for estimating interfering-signal power and a resource element (one resource element is configured with one subcarrier×one OFDM symbol) for the interfering signal (ABS transmission signal of macro-cell base station) being multiplexed.

Macro-cell CRS channel estimator 209 calculates a channel estimation value (referred to as a macro-cell CRS channel estimation value hereinafter) based on the macro-cell CRS input from physical channel demapping unit 205, in accordance with the instruction from interfering-signal information acquisition unit 208. Macro-cell CRS channel estimator 209 outputs the macro-cell CRS channel estimation value to interfering-signal power estimator 210.

Interfering-signal power estimator 210 calculates desired signal power from the small-cell CRS channel estimation value input from small-cell CRS channel estimator 206 and the noise power input from noise power estimator 207. Interfering-signal power estimator 210 subtracts the desired signal power and the noise power from reception power calculated from the macro-cell CRS channel estimation value input from macro-cell CRS channel estimator 209, and thereby estimates the remaining reception power as signal power from the macro-cell base station, that is, interfering-signal power. Interfering-signal power estimator 210 outputs the estimated interfering-signal power to signal separator 211 and demodulator 212.

Signal separator 211 separates the reception signal (downlink data signal) input from physical channel demapping unit 205 into a plurality of data signals (streams). The separation is performed based on the small-cell CRS channel estimation value (channel estimation value between small-cell base station 100 and the own terminal) input from small-cell CRS channel estimator 206, the noise power input from noise power estimator 207, and the interfering-signal power input from interfering-signal power estimator 210. Specifically, signal separator 211 generates a reception weight (for example, minimum mean square error (MMSE) reception weight) based on the small-cell CRS channel estimation value, the noise power, and the interfering-signal power. Signal separator 211 separates the signal by multiplying the reception signal by the reception weight. Signal separator 211 outputs the signals obtained by the separation and the reception weight to demodulator 212.

Demodulator 212 performs demodulation and soft decision processing based on the reception weight input from signal separator 211, the small-cell CRS channel estimation value input from small-cell CRS channel estimator 206, the noise power input from noise power estimator 207, and the interfering-signal power input from the interfering-signal power estimator 210.

Specifically, demodulator 212 demodulates each of the plurality of data signals which has been obtained by the separation and is input from signal separator 211, and calculates a soft decision value (likelihood sequence). Demodulator 212 generates the soft decision weight (for example, signal to interference and noise ratio (SINR)) based on the reception weight, the small-cell CRS channel estimation value, the noise power, and the interfering-signal power. Demodulator 212 performs weighting by multiplying the soft decision value by the soft decision weight. For example, the soft decision weight has a value increasing as interference becomes smaller and has a value decreasing as the interference becomes larger. Demodulator 212 outputs the weighted soft decision value to error correction decoder 213.

Error correction decoder 213 performs error correction decoding on the soft decision value which has been weighted and is input from demodulator 212, and outputs a signal (that is, decoded data of a desired signal) obtained after the decoding.

[Operations of Small-Cell Base Station 100 and In-Small-Cell Terminal 200]

Next, operations of small-cell base station 100 and in-small-cell terminal 200 described above will be described.

<Methods of Generating Reception Weight and Soft Decision Weight>

Firstly, methods of generating the reception weight and the soft decision weight generated by signal separator 211 and demodulator 212 in in-small-cell terminal 200 will be described in detail.

As an example, a case where small-cell base station 100 includes two transmission antennae (2Tx), in-small-cell terminal 200 includes two reception antennae (2Rx), and spatial multiplexing is performed in a manner of MIMO of 2Tx×2Rx will be described below. The number of transmission or reception antennae used in MIMO spatial multiplexing between small-cell base station 100 and in-small-cell terminal 200 is not limited thereto.

A reception signal r received from small-cell base station 100 by in-small-cell terminal 200 is defined by Expression (1).

[Expression 1]

$$r = H W_{TX} s + n = H' s + n \qquad (1)$$

Here, H indicates a channel response representing a channel between small-cell base station 100 and in-small-cell terminal 200. $W_{TX}$ indicates a transmission weight. s indicates a transmission signal (desired signal). n indicates noise. With Expression (1), H' is represented by $HW_{TX}$.

On the reception side (terminal), a reception weight and the soft decision weight are generated based on an estimation value of the channel response H'. Descriptions will be made below on the assumption that H' indicates the estimation value.

Firstly, a general example of generating the reception weight and the soft decision weight will be described. In practice, the reception weight and the soft decision weight are defined in a unit of a subcarrier and an OFDM symbol (that is, resource element unit). However, here, the unit will not be described for simple descriptions.

The reception weight (MMSE reception weight) $W_{RX}$ is represented by Expression (2).

[Expression 2]

$$W_{RX} = (H'^H H' + P_n I_{N_{RX}})^{-1} H'^H \qquad (2)$$

Here, the superscript H indicates the Hermitian transpose operation. $P_n$ indicates noise power (for example, average value in a subframe). $I_{NRX}$ indicates a unit matrix having a size corresponding to the number of reception antennae in the terminal.

The terminal multiplies the reception signal r (Expression (1)) by the reception weight $W_{RX}$, and separates the signal into signals of two streams as in Expression (3).

[Expression 3]

$$W_{RX} r = W_{RX} H' s + W_{RX} n \qquad (3)$$
$$= \begin{bmatrix} wh'_{00} & wh'_{01} \\ wh'_{10} & wh'_{11} \end{bmatrix} \begin{bmatrix} s_0 \\ s_1 \end{bmatrix} + \begin{bmatrix} w_{00} & w_{01} \\ w_{10} & w_{11} \end{bmatrix} \begin{bmatrix} n_0 \\ n_1 \end{bmatrix}$$
$$= \begin{bmatrix} wh'_{00} s_0 + wh'_{01} s_1 + w_{00} n_0 + w_{01} n_1 \\ wh'_{10} s_0 + wh'_{11} s_1 + w_{10} n_0 + w_{11} n_1 \end{bmatrix}$$

A relationship between $W_{RX} H'$ and wh' in Expression (3) is defined by Expression (4).

[Expression 4]

$$W_{RX} H' = \begin{bmatrix} w_{00} & w_{01} \\ w_{10} & w_{11} \end{bmatrix} \begin{bmatrix} h'_{00} & h'_{00} \\ h'_{10} & h'_{11} \end{bmatrix} \equiv \begin{bmatrix} wh'_{00} & wh'_{01} \\ wh'_{10} & wh'_{11} \end{bmatrix} \qquad (4)$$

A soft decision weight (SINR) for each of the two streams shown in Expression (3) is represented by Expression (5).

[Expression 5]

$$SINR_0 = \frac{|wh'_{00}|^2 |s_0|^2}{|wh'_{01}|^2 |s_1|^2 + |w_{00}|^2 |n_0|^2 + |w_{01}|^2 |n_1|^2} \qquad (5)$$
$$= \frac{|wh'_{00}|^2}{|wh'_{01}|^2 + (|w_{00}|^2 + |w_{01}|^2) P_n}$$
$$SINR_1 = \frac{|wh'_{11}|^2 |s_1|^2}{|wh'_{10}|^2 |s_0|^2 + |w_{10}|^2 |n_0|^2 + |w_{11}|^2 |n_1|^2}$$
$$= \frac{|wh'_{11}|^2}{|wh'_{10}|^2 + (|w_{10}|^2 + |w_{11}|^2) P_n}$$

In Expression (5), $|s_0|^2 = |s_1|^2 = 1$ and $|n_0|^2 = |n_1|^2 = P_n$.

Here, in soft decision weights $SINR_0$ and $SINR_1$ shown in Expression (5), $|wh'_{00}|^2$ and $|wh'_{11}|^2$ indicate desired signal power. $(|w_{00}|^2 + |w_{01}|^2) P_n$ and $(|w_{10}|^2 + |w_{11}|^2) P_n$ indicate noise power. $|wh'_{01}|^2$ and $|wh'_{10}|^2$ indicate interference power between the two streams for the terminal.

Next, an example of generating the reception weight and the soft decision weight in the exemplary embodiment will be described.

In the exemplary embodiment, in-small-cell terminal 200 generates the reception weight and the soft decision weight in consideration of interfering-signal power from the macro-cell base station in addition to the general parameters which are described above and are used in generating the reception weight and the soft decision weight.

Specifically, a reception weight $W_{RX}(k,l)$ in the k-th subcarrier and the l-th OFDM symbol, which is used in signal separator 211 is represented by Expression (6).

[Expression 6]

$$W_{RX}(k,l) = (H'(k,l)^H H'(k,l) + (P_n + P_i(k,l)) I_{N_{RX}})^{-1} H'(k,l)^H \qquad (6)$$

In Expression (6), H'(k,l) indicates the small-cell CRS channel estimation value estimated by small-cell CRS channel estimator 206. $P_n$ indicates the noise power estimated by noise power estimator 207. $P_i(k,l)$ indicates the interfering-signal power estimated by interfering-signal power estimator 210.

The small-cell CRS channel estimation value H'(k,l) and the interfering-signal power $P_i(k,l)$ are estimated in a unit of a subcarrier or an OFDM symbol. The noise power $P_n$ may be an average value in predetermined subcarriers and OFDM symbols, for example.

Signal separator 211 multiplies the reception signal r (Expression (1)) by the reception weight $W_{RX}(k,l)$ represented by Expression (6) and separates the signal into signals of two streams.

With Expression (6), it is understood that characteristics are closer to characteristics similar to those in the zero-forcing (ZF) method as the interfering-signal power $P_i$ becomes smaller and are closer to characteristics similar to those in a maximum ratio combining (MRC) method as the interfering-signal power $P_i$ becomes larger.

The soft decision weight (SINR) for each of the two streams obtained by separation based on the reception weight $W_{RX}(k,l)$ represented by Expression (6) is represented by Expression (7).

[Expression 7]

$$SINR_0 = \frac{|wh'_{00}(k,l)|^2}{|wh'_{01}(k,l)|^2 + (|w_{00}(k,l)|^2 + |w_{01}(k,l)|^2)(P_n + P_i(k,l))} \qquad (7)$$
$$SINR_1 = \frac{|wh'_{11}(k,l)|^2}{|wh'_{10}(k,l)|^2 + (|w_{10}(k,l)|^2 + |w_{11}(k,l)|^2)(P_n + P_i(k,l))}$$

With Expression (7), the soft decision weight increases as the interfering-signal power $P_i$ becomes smaller. The soft decision weight decreases as the interfering-signal power $P_i$ becomes larger. That is, as the interfering-signal power $P_i$ (that is, inter-cell interference) becomes smaller, the correctness (that is, likelihood as a result of soft decision) of a desired signal received from small-cell base station 100 by in-small-cell terminal 200 is improved.

In Expressions (6) and (7), the interfering-signal power $P_i(k,l)$ may be represented as in Expression (8).

[Expression 8]

$$P_i(k,l) = \begin{cases} P_i, & \text{if } (k,l) \in M_{ABS} \\ 0, & \text{else} \end{cases} \qquad (8)$$

Here, $M_{ABS}$ indicates a set of resources (resource elements) for a signal being multiplexed in ABS transmission.

Thus, in-small-cell terminal 200 generates the reception weight and the soft decision weight in consideration of the interfering-signal power $P_i(k,l)$, only for resources affected by an interfering signal for in-small-cell terminal 200. That is, in-small-cell terminal 200 generates the reception weight and the soft decision weight without considering the interfering-signal power $P_i$, for resources not affected by the interfering signal for in-small-cell terminal 200 (for example, see Expressions (3) and (5)).

In-small-cell terminal 200 may use an average value of values estimated in a predetermined period (for example, one subframe), as the interfering-signal power $P_i$. Thus, it is possible to improve estimation accuracy of the interfering-signal power $P_i$.

Operation Example of Interference Reduction Processing

Figure 4:
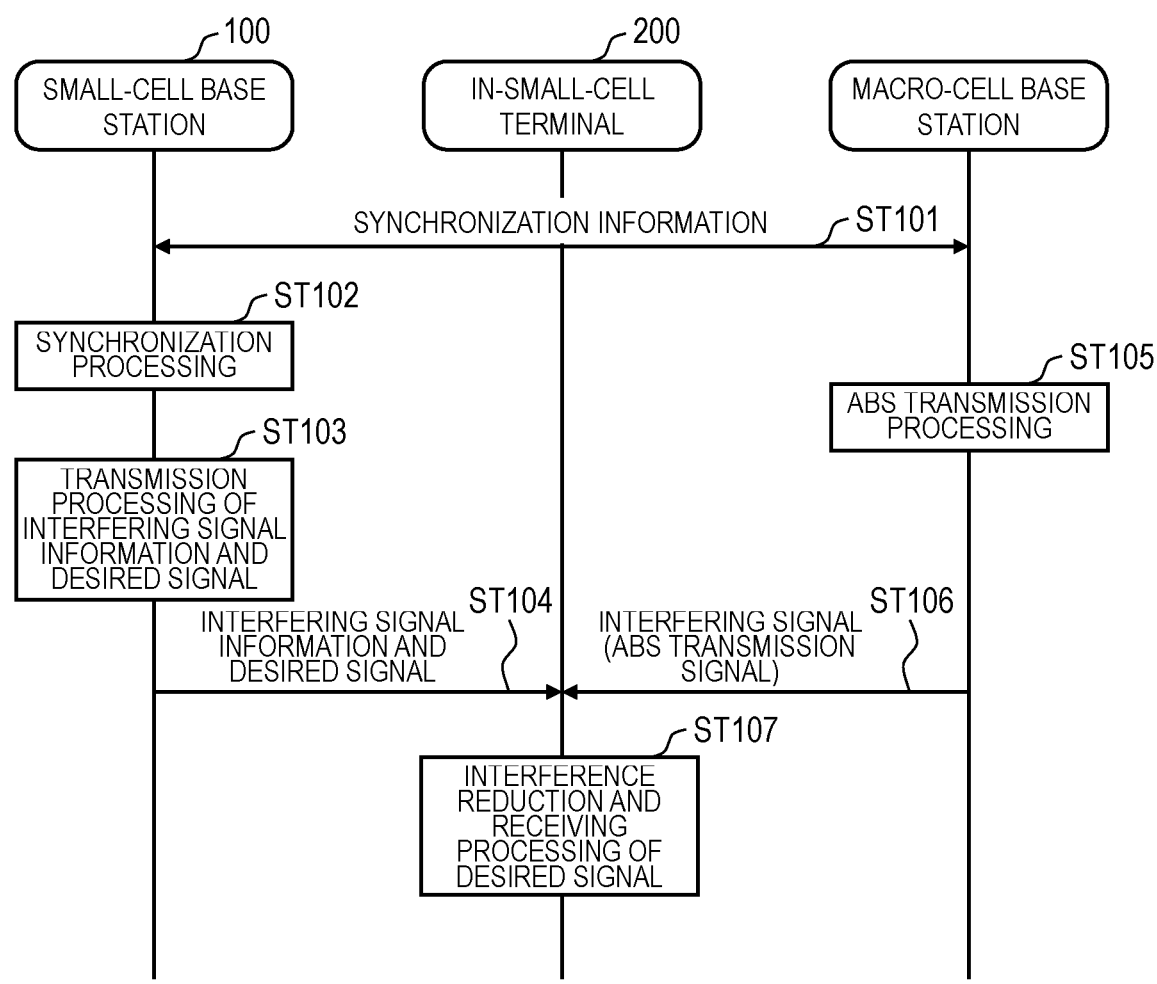
FIG. 4 is a sequence diagram illustrating interference reduction processing according to the aspect of the disclosure.

FIG. 4 is a sequence diagram illustrating an operation in each device in the communication system illustrated in FIG. 1.

In FIG. 4, in Step (simply described as "ST" hereinafter) 101, small-cell base station 100 and the macro-cell base station transmit and receive synchronization information, for example, via a global positioning system (GPS), a backhaul network, or listening.

In ST102, small-cell base station 100 synchronizes with the macro-cell base station based on the synchronization information acquired in ST101.

In ST103, small-cell base station 100 performs transmission processing of interfering signal information regarding a signal (for example, signal in ABS transmission) which acts as an interfering signal into in-small-cell terminal 200 and is transmitted from the macro-cell base station, and performs transmission processing of transmission data serving as a desired signal for in-small-cell terminal 200. In ST104, small-cell base station 100 transmits the interfering signal information and the transmission data (desired signal) to in-small-cell terminal 200.

In ST105, the macro-cell base station performs transmission processing of the signal (may be also referred to as an ABS transmission signal) transmitted in ABS transmission. In ST106, the macro-cell base station transmits the ABS transmission signal (that is, interfering signal).

In ST107, in-small-cell terminal 200 performs reduction processing of the ABS transmission signal (interfering signal) transmitted in ST106 and performs reception processing of the transmission data (interfering signal information and desired signal) transmitted in ST104.

Specifically, firstly, in-small-cell terminal 200 estimates interfering-signal power based on the received interfering signal information. For example, in-small-cell terminal 200 generates a reception weight based on Expression (6) and generates a soft decision weight based on Expression (7). In-small-cell terminal 200 performs reception processing of the desired signal received in ST104, based on the reception weight and the soft decision weight which have been generated.

<Notifying Method of Interfering Signal Information>

As described above, it is necessary that in-small-cell terminal 200 previously has the interfering signal information, in order to cause in-small-cell terminal 200 to perform interference reduction processing on the ABS transmission signal.

A method of notifying in-small-cell terminal 200 of the interfering signal information will be described below in detail.

For example, the interfering signal information includes information as follows.

(1) Cell ID of a macro-cell base station (may also be referred to as an interfering base station hereinafter) applying interference (2) Number of transmission antennas in the interfering base station (3) ABS transmission pattern of the interfering base station For example, a notification of the interfering signal information of (1) and (2) may be performed from small-cell base station 100 to in-small-cell terminal 200, through a message "RadioResourceConfigDedicated IE" defined in the 3rd Generation Partnership Project Long Term Evolution (3GPP LTE).

A notification of the interfering signal information of (3) may be performed from small-cell base station 100 to in-small-cell terminal 200 in a manner as with following Method 1 or Method 2.

In Method 1, small-cell base station 100 notifies in-small-cell terminal 200 of information indicating the transmission pattern of an ABS, which is set in the interfering base station (for example, information indicating whether or not the subframe is an ABS) as the interfering signal information. For example, the information indicating the ABS transmission pattern is bitmap information (for example, 1 in a case of an ABS and 0 in a case of not an ABS) indicating whether or not the subframe is an ABS, for each of subframes of which the number is random.

In Method 2, small-cell base station 100 transmits instruction information to in-small-cell terminal 200. The instruction information is used for an instruction of whether or not a mode is a mode in which the interference reduction processing is applied (that is, whether or not the interference reduction processing is performed). In Method 2, the transmission pattern of an ABS, which is set in the macro-cell base station is caused to match with a pattern (for example, Measurement Subframe Pattern defined in LTE) indicating a subframe for defining reception quality for the neighboring cell, in advance. Thus, the ABS transmission pattern set in the macro-cell base station is identical to Measurement Subframe Pattern.

In a case where the instruction to apply the interference reduction processing is received by the interfering signal information, in-small-cell terminal 200 estimates the interfering-signal power based on Measurement Subframe Pattern. That is, in-small-cell terminal 200 can specify a subframe for applying the interference reduction processing, with reference to Measurement Subframe Pattern.

Explanations of Advantageous Effects

As described above, in the exemplary embodiment, in in-small-cell terminal 200, radio receiver 201 receives the plurality of data signals which is transmitted from small-cell base station 100 disposed in the area covered by the macro-cell base station and is spatially multiplexed. Interfering-signal power estimator 210 estimates power of a signal from the macro-cell base station as interfering-signal power. Signal separator 211 generates the reception weight based on the interfering-signal power and separates the plurality of data signals from each other based on the reception weight. In in-small-cell terminal 200, demodulator 212 demodulates each of the plurality of data signals obtained by separation of signal separator 211, so as to calculate the soft decision value. Demodulator 212 generates the soft decision weight based on the interfering-signal power and the reception weight and performs weighting on the soft decision value based on the soft decision weight.

As described above, since in-small-cell terminal 200 performs reception processing of a desired signal based on the reception weight and the soft decision weight obtained considering the interfering-signal power, it is possible to reduce interference by an ABS transmission signal and to improve reception quality of the desired signal.

In the method (Japanese Patent No. 5383725 or Japanese Patent Unexamined Publication No. 2013-123163) in the related art, an interference component is removed by subtracting an interference replica from a reception signal regardless of estimation accuracy of a channel (that is, accuracy of the interference replica). Therefore, in a case where channel estimation is relatively easy (for example, case of additive white Gaussian noise (AWGN) channel), an interference reduction effect is large. However, in a case where channel estimation is relatively difficult as in a multipath channel, the interference reduction effect is small. That is, in the technology in the related art, the accuracy of the interference replica tends to be low in the multipath environment as assumed in the exemplary embodiment. Even though the interference reduction processing is performed, reception performance is conversely deteriorated by adding unnecessary noise.

On the contrary, in the exemplary embodiment, in-small-cell terminal 200 does not estimate a channel but estimates interfering-signal power, in order to reduce interference. In-small-cell terminal 200 generates a reception weight and a soft decision weight to which the estimated interfering-signal power has been applied. In other words, in-small-cell terminal 200 applies influence of an interfering signal from the macro-cell base station to generation of a weight (reception weight and soft decision weight). Here, it is possible to estimate the interfering-signal power with high accuracy, for example, by being calculated as an average value in a predetermined period, in comparison to the channel estimation value. That is, in-small-cell terminal 200 can generate the reception weight and the soft decision weight based on the interfering-signal power, without depending on estimation accuracy of a channel.

In this manner, even in an environment in which estimation accuracy of a channel is low as in a multipath environment, in-small-cell terminal 200 can reduce inter-cell interference from a macro-cell into a small cell without depending on estimation accuracy of a channel and without adding unnecessary noise by the interference reduction processing, in a state of being capable of calculating interfering-signal power with high accuracy.

Since using the interference replica as in Japanese Patent No. 5383725 and Japanese Patent Unexamined Publication No. 2013-123163 is not required, it is not necessary that in-small-cell terminal 200 includes a circuit for an operation using the interference replica. Thus, this is effective for reducing the size of a circuit in a terminal and reducing a processing burden.

Hitherto, the exemplary embodiments according to the aspect of the disclosure are described.

In the exemplary embodiment, a signal transmitted in ABS transmission is described as an example of the interfering signal. However, the interfering signal (that is, interference removal target) from a macro-cell into a small cell is not limited to the signal in ABS transmission. The signal as the interference removal target may be a signal in which in-small-cell terminal 200 already knows a mapping position of the signal and is capable of estimating interference power.

In the exemplary embodiment, a case where in-small-cell terminal 200 estimates the interfering-signal power using the CRS is described. However, the reference signal used for estimating the interfering-signal power is not limited to the CRS and may be another reference signal.

In the exemplary embodiment, a case where in-small-cell terminal 200 generates both the reception weight and the soft decision weight based on interference power from the macro-cell base station is described. However, the disclosure is not limited thereto. For example, in-small-cell terminal 200 may generate any one of the reception weight and the soft decision weight based on the interference power from the macro-cell base station.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal includes: a receiver, which, in operation, receives a plurality of data signals that is spatially multiplexed, the plurality of data signals being transmitted from a small-cell base station disposed in an area covered by a macro-cell base station; an estimator, which, in operation, estimates power of a signal from the macro-cell base station as interfering-signal power; and a signal separator, which, in operation, generates a reception weight based on the interfering-signal power and separates the plurality of data signals from each other based on the reception weight.

The terminal may further include: a demodulator, which, in operation, calculates a soft decision value by demodulating each of the plurality of data signals separated by the signal separator, generates a soft decision weight based on the interfering-signal power and the reception weight, and performs weighting on the soft decision value based on the soft decision weight.

In the terminal, the signal separator may apply the interfering-signal power to a resource on which the signal from the macro-cell base station acts as interference, when generating the reception weight.

In the terminal, the demodulator may apply the interfering-signal power to a resource on which the signal from the macro-cell base station acts as interference, when generating the soft decision weight.

The terminal may further include: an acquisition unit, which, in operation, acquires a control signal including interfering signal information regarding the signal from the macro-cell base station, from the small-cell base station.

In the terminal, a notification of interfering signal information may be performed from the small-cell base station by using RadioResourceConfigDedicated IE.

In the terminal, the interfering signal information may be information indicating a transmission pattern of an almost blank subframe (ABS) set in the macro-cell base station.

In the terminal, the interfering signal information may be instruction information indicating whether or not interference reduction processing is performed on an interfering signal from the macro-cell base station, a transmission pattern of an almost blank subframe (ABS) set in the macro-cell base station may be identical to Measurement Subframe Pattern, and the estimator may estimate the interfering-signal power based on the Measurement Subframe Pattern in a case where an instruction to apply the interference reduction processing is received by the instruction information.

A communication method includes: receiving a plurality of data signals that is spatially multiplexed, the plurality of data signals being transmitted from a small-cell base station disposed in an area covered by a macro-cell base station; estimating power of a signal from the macro-cell base station as interfering-signal power; and generating a reception weight based on the interfering-signal power and separating the plurality of data signals from each other based on the reception weight.

The communication method may further include: calculating a soft decision value by demodulating each of the plurality of data signals separated by the signal separator, generating a soft decision weight based on the interfering-signal power and the reception weight, and performing weighting on the soft decision value based on the soft decision weight.

What is claimed is:

1. A terminal comprising:
    a receiver, which, in operation, receives a plurality of data signals that is spatially multiplexed, the plurality of data signals being transmitted from a small-cell base station disposed in an area covered by a macro-cell base station; and
    circuitry, which, in operation:
        estimates power of a signal from the macro-cell base station as an interfering-signal power based on a measurement subframe pattern, a transmission pattern of an almost blank subframe (ABS) set in the macro-cell base station being identical to the measurement subframe pattern;
        generates a reception weight based on the interfering-signal power; and
        separates the plurality of data signals from each other based on the reception weight.

2. The terminal of claim 1,
    wherein the circuitry, in operation, calculates a soft decision value by demodulating each of the plurality of data signals, generates a soft decision weight based on the interfering-signal power and the reception weight, and performs weighting on the soft decision value based on the soft decision weight.

3. The terminal of claim 1,
    wherein the circuitry, in operation, applies the interfering-signal power to a resource on which the signal from the macro-cell base station acts as interference, when generating the reception weight.

4. The terminal of claim 2,
    wherein the circuitry, in operation, applies the interfering-signal power to a resource on which the signal from the macro-cell base station acts as interference, when generating the soft decision weight.

5. The terminal of claim 1,
    wherein the circuitry, in operation, acquires a control signal including interfering signal information regarding the signal from the macro-cell base station, from the small-cell base station.

6. The terminal of claim 1,
    wherein a notification of interfering signal information is performed from the small-cell base station by using RadioResourceConfigDedicated IE.

7. The terminal of claim 5,
    wherein the interfering signal information is information indicating a transmission pattern of an almost blank subframe (ABS) set in the macro-cell base station.

8. The terminal of claim 5,
    wherein the interfering signal information is instruction information indicating whether or not interference reduction processing is to be applied to an interfering signal from the macro-cell base station, and
    the circuitry, in operation, estimates the power of the signal from the macro-cell base station as the interfering-signal power based on the measurement subframe pattern in a case where the instruction information indicates the interference reduction processing is to be applied to the interfering signal from the macro-cell base station.

9. A communication method comprising:
    receiving a plurality of data signals that is spatially multiplexed, the plurality of data signals being transmitted from a small-cell base station disposed in an area covered by a macro-cell base station;

estimating power of a signal from the macro-cell base station as an interfering-signal power based on a measurement subframe pattern, a transmission pattern of an almost blank subframe (ABS) set in the macro-cell base station being identical to the measurement subframe pattern;

generating a reception weight based on the interfering-signal power; and separating the plurality of data signals from each other based on the reception weight.

10. The communication method of claim 9, further comprising:

calculating a soft decision value by demodulating each of the plurality of data signals;

generating a soft decision weight based on the interfering-signal power and the reception weight; and performing weighting on the soft decision value based on the soft decision weight.

11. The communication method of claim 9, further comprising:

acquiring, from the small-cell base station, a control signal including interfering signal information that indicates whether or not interference reduction processing is to be applied to the signal from the macro-cell base station, wherein the power of the signal from the macro-cell base station is estimated as an interfering-signal power based on a measurement subframe pattern, in a case where the interfering signal information indicates the interference reduction processing is to be applied to the signal from the macro-cell base station.

* * * * *